Apr. 24, 1923. 1,452,809
J. LOGUE
WORKHOLDING AND POSITIONING DEVICE FOR RULE AND BORDER TYPE OR SLUG
CUTTING MACHINES
Filed Aug. 5, 1921 3 Sheets-Sheet 1
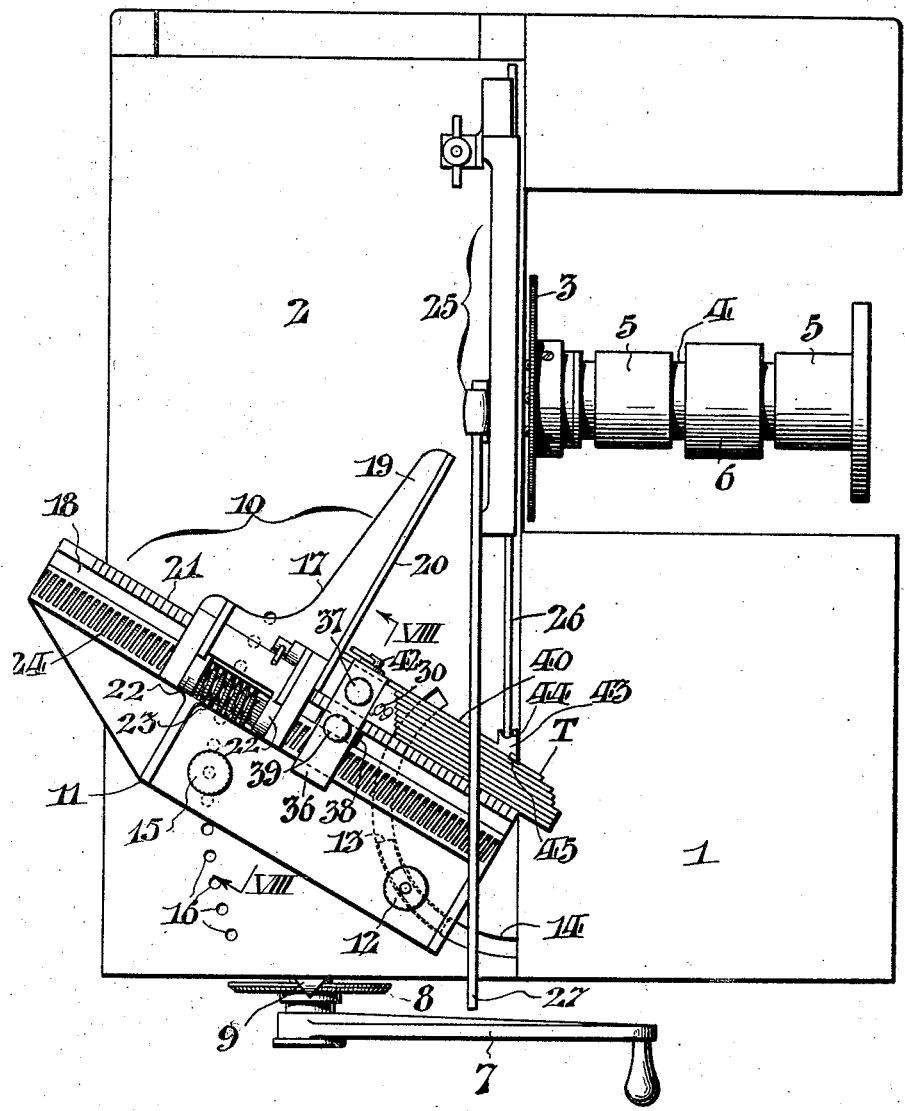
FIG. I.
FIG. VIII.
WITNESSES:
John C. Bergner
James H. Bell
INVENTOR.
John Logue,
BY
ATTORNEY.

Apr. 24, 1923.
1,452,809
J. LOGUE
WORKHOLDING AND POSITIONING DEVICE FOR RULE AND BORDER TYPE OR SLUG CUTTING MACHINES
Filed Aug. 5, 1921
3 Sheets-Sheet 2
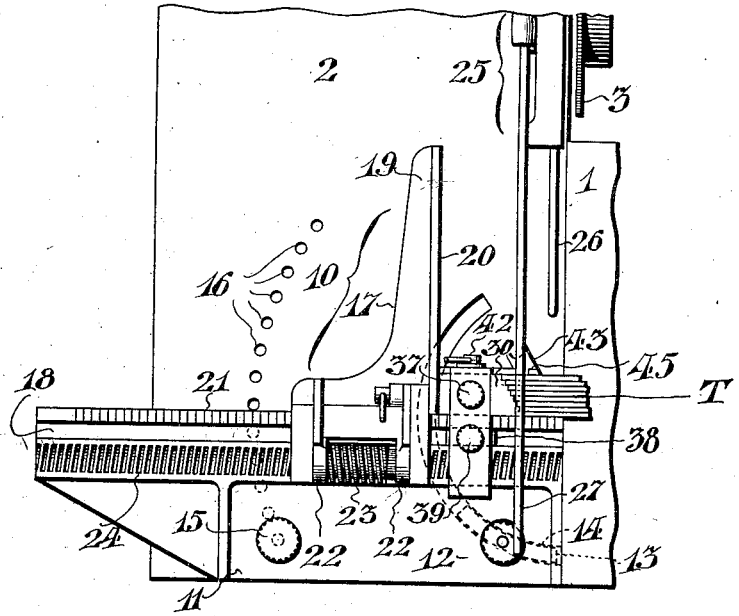
FIG. II.
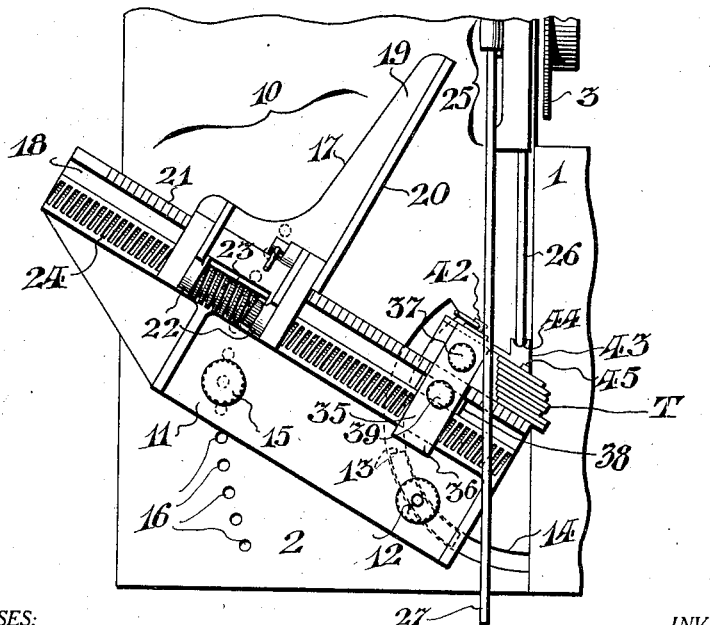
FIG. III.
WITNESSES:
John C. Bergner
James H. Bell
INVENTOR:
John Logue,
BY Emery & Paul
ATTORNEYS.

Apr. 24, 1923. 1,452,809
J. LOGUE
WORKHOLDING AND POSITIONING DEVICE FOR RULE AND BORDER TYPE OR SLUG
CUTTING MACHINES
Filed Aug. 5, 1921 3 Sheets-Sheet 3
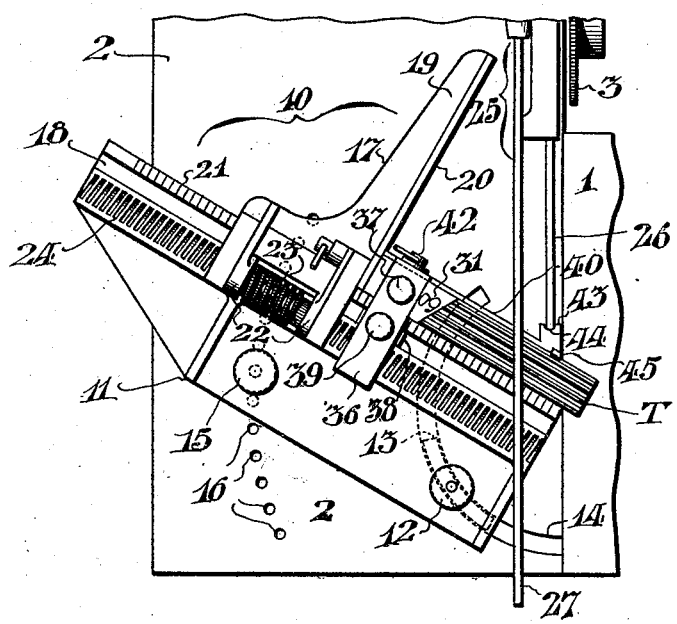
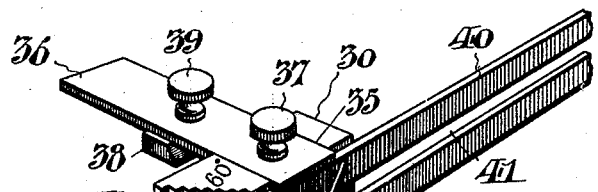
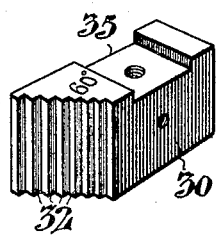
WITNESSES:
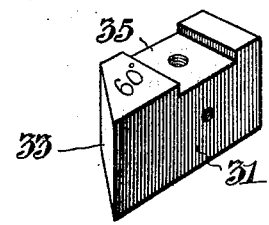
INVENTOR:
John Logue,
BY
ATTORNEYS.

Patented Apr. 24, 1923.

1,452,809

UNITED STATES PATENT OFFICE.

JOHN LOGUE, OF PHILADELPHIA, PENNSYLVANIA.

WORKHOLDING AND POSITIONING DEVICE FOR RULE AND BORDER TYPE OR SLUG-CUTTING MACHINES.

Application filed August 5, 1921. Serial No. 489,960.

*To all whom it may concern:*

Be it known that I, JOHN LOGUE, a citizen of the United States, residing in Philadelphia, in the county of Philadelphia and State of Pennsylvania, have invented certain new and useful Improvements in Workholding and Positioning Devices for Rule and Border Type or Slug-Cutting Machines, whereof the following is a specification, reference being had to the accompanying drawings.

My invention relates to work holding and positioning devices useful in connection with machines employed in printers' composing rooms for cutting rule and border slugs.

Amongst the objects of my invention are to make it possible to miter and, at the same time, to cut a multiplicity of rules or borders to uniform lengths in a single operation; to miter simultaneously, a series of rules and borders arranged in ordered sequence and intended for use in making up composite borders; and in general, to facilitate mitering of rules and borders so that this operation may be accomplished, not only with greater ease, but more accurately and expeditiously than heretofore with a view towards effecting the utmost possible saving of time and labor.

Other objects and attendant advantages of my invention will become readily apparent from the detailed description which follows:

In the drawings, Fig. I is a plan view of a rule and border slug machine conveniently illustrating the use of my invention.

Figs. II and III are similar views showing the necessary steps in setting the machine to miter rules and borders of very short lengths.

Fig. IV is an illustration similar to the above showing my invention as it is used in mitering rule type.

Fig. V is a perspective detail, view showing my improved work holding and positioning device on an enlarged scale.

Figs. VI and VII are views showing two different types of abutment blocks which may be interchangeably used in cutting miters of different angles; and Fig. VIII is a detail cross sectional view along the lines VIII—VIII in Fig. I.

In order to facilitate the ready understanding of my invention, I will first describe, briefly, a cutting apparatus or machine wherewith it is adapted to be used. From the illustrations of the drawings, it will be apparent to those familiar with the printing art, that the machine there shown is of standard or typical construction and design, and comprises a table 1 having a flush movable section 2 for supporting the work to be operated upon. After being properly mounted and clamped to the movable section 2 of the table, as will be explained more definitely later, the rule or border slugs to be cut may be moved relative to the cutting tool which, in the present instance, is in the form of a rotary saw disk 3 secured upon a shaft 4 journalled in appropriate bearings 5—5. The saw is actuated by a pulley 6 adapted to be driven by a belt, with a suitable motor (not shown) preferably located beneath the table 1. Shifting of the work supporting section 2 of the table is effected under control of a hand crank 7 wherewith is associated a graduated dial 8 and a coordinative fixed pointer 9.

Mounted to the top of the movable section 2 of the table is a gauge device comprehensively designated in the drawings by the numeral 10 and by aid of which the slugs to be cut may be set or placed in various angular positions with respect to the cutting tool or disk 3. Said gauge device comprises a swivel member 11 to the under side of which, and through the instrumentality of a screw pin 12, is secured a slide sector 13 which projects into and is guided by an arcuate slot 14 in the table section 2, said slot having its generating center in the plane of the front face of the cutting disk 3. The gauge member 11 may be set in various angular positions with respect to the cutting tool by means of a locking pin 15 which is registerable with apertures 16 in the movable section 2 of the table. Associated with the gauge member 11 is an auxiliary gauge member 17 which is slidable relatively under guidance of a longitudinal undercut slot 18 in the former. The auxiliary gauge member 17 has an extension in the form of a finger 19 whose straight edge 20 is perpendicular to a similar straight edge 21 along the side of the member 11. The auxiliary gauge member 17 has, furthermore, integral lugs 22—22 between which a screw worm 23 is rotatively supported. Said screw worm engages with a machined rack 24 of the member 11, and thus constitutes a micrometer adjustment means. The pitch of the screw threading is based on the "point" as a unit, and in practice the screw worm is graduated circumferentially so that adjustments may be had which are fractional to the graduations along the top of the gauge member 11 adjacent its straight edge 21.

A work clamping means or vice 25 also forms part of the standard equipment of a cutting machine such as herein illustrated. This vice, it will be observed, is secured upon the top of a movable table section 2 along that side which extends adjacent to the front face of the disk 3, and comprises a rod 26 adapted to be set in different extended positions by a suitable locking means operable through a handle bar 27. By this means, the slugs indicated at "T" may ordinarily be engaged at their forward ends and securely clamped against the straight edges of the gauge member 11 so that the possibility of accidental displacement during the cutting operations is positively prevented.

The work holding and positioning device of my invention comprises two sets of blocks of two different species such as indicated by the numerals 30 and 31 in Figs. VI and VII and which in practice correspond in number to the various angles likely to be used in mitering and which are so identified as suggested in the illustrations. These species are readily distinguishable by reason of the difference in the character of their beveled ends while the individual elements of each set differ only in the slope of the bevel. The blocks of one set have notches 32 in their sloping ends and the others are simply plain as indicated at 33. The reasons for such distinctions will become readily obvious from subsequent explanation and the description for the present will be confined only to those features which are common to all of the blocks. Referring for a moment to Fig. V of the drawings, it will be seen that the block 30 has its upper surface recessed as at 35 for accommodation of the end of the laterally extending plate 36, which, in order to allow of interchangeability of the blocks, is removably secured by means of a thumb screw 37. Attached to the under side of the plate is a slide piece 38 having a configuration corresponding to that of the longitudinal undercut slot 18 of the gauge number 11 and is clampable within said slot by means of a knurled thumb screw 39 to hold the block in different adjusted positions.

For use in association with the block to assist in holding the type, or slugs to the straight edge 21 of the gauge member 11, I have provided retainer strips such as shown at 40. The strip is adapted to overlap the inner ends of the slugs and in order to allow adjustability relative to a block, is slotted longitudinally as at 41 for passage of a clamp screw 42. The retainer strip has a head 43 which is notched as indicated at 44, for cooperation with the end of the extensible bar 26 of the vice 25. An upstanding lug 45 of the head 43 serves as a means whereby the strip may be grasped in adjusting, and the latter in the course of such adjusting is guided by the overhanging end of the plate 36, see Fig. V.

In Fig. I, I have shown the manner in which a series of slugs may be mitered to an angle of 60 degrees in accordance with my invention. The block of the type 30 identified with the number corresponding to this angle is employed for this purpose and from the illustration, it will be apparent that the function of the steps or notches 32 in the beveled end of the block is to accommodate the abutting ends of the slugs. Thus when the gauge device 10, as a whole, has been swung to an angle of 60 degrees, the beveled end of the block will lie parallel to the trimming disk 3, with the result that the slugs will be cut to uniform lengths. If within the scope of the graduations of the gauge member 11, adjustment of the block may be made without aid of the auxiliary gauge member 17. If, however, finer adjustment should be required, the screw worm 23 may be employed in a manner already understood. After the slugs have been properly positioned as explained, the retainer strip 40 is adjusted so that the notch 44 of the head 43 is in line with the extensible bar 26 of the vice 25 whereupon said bar is drawn forward and locked by proper manipulation of the handle bar 27. From the above it will be seen that by my invention, a number of rule or border slugs may be cut to uniform lengths and at the same time mitered to any desired angle.

When exceedingly short slugs are to be mitered I proceed in the manner suggested in Figs. II and III. From the former of these illustrations it will be observed that the block 30 (when it is necessary to employ the auxiliary gauge member 17) is set while the gauge mechanism 10 occupies a normal position, and, before the latter is swung, the auxiliary gauge member 17 is withdrawn to the extent necessary to avoid engagement with the cutter disk 3 when the table section 2 is moved in making the cut. Heretofore in cutting short slug lengths, it has been necessary to employ a number of fillers intermediate the straight edge of the gauge element and the slugs, (to avoid engagement of the finger of auxiliary gauge member 17 with the cutter disk 3) and these fillers of necessity, had first to be cut accurately to lengths which resulted in considerable loss of time.

By my invention it will be seen that the necessity for the extra step has been entirely eliminated.

When type bars or slugs are to be mitered complementarily at opposite ends, I make the first cut as already understood and then reverse the position of the type and employ a block of the species 31 in the manner suggested in Fig. IV. In this way it is possible to make up in the case of border slugs, a composite border which, as will be appreciated by those skilled in the art to which my invention pertains, could not be done heretofore without trimming the bars individually.

Having thus described my invention, I claim:

1. The combination with a type cutting machine having a cutting tool, a work supporting table movable with respect to said tool, and a gauge member pivotally mounted to said table, of a work holding and positioning device for use in mitering affording abutting surfaces for the ends of the rule or border slugs disposed at substantially right angles to the latter and adapted to position their abutting ends at the angle to which the miter is to be cut so that a number of the rule or border slugs may be cut to uniform length while being mitered.

2. The combination with a type cutting machine having a cutting tool, a work supporting table movable with respect to said tool, and a gauge member pivotally mounted to said table, of a work holding and positioning device for use in mitering in the form of a block adjustable along said gauge member, said block having its forward end formed with a multiplicity of steps or notches disposed at the angle to which the miter is to be cut to afford individual receiving notches for abutment of the ends of rule or border slugs so that a number of the latter may be cut to uniform lengths while being mitered.

3. The combination with a type cutting machine having a cutting tool, a work supporting table movable with respect to said tool, and a gauge member pivotally mounted to said table, of a work holding and positioning device for use in mitering in the form of a block adjustable along said gauge member, said block having its forward end sloped at the angle to which the miter is to be cut to afford an abutment for the ends of the rule or border slugs so that a number of the latter may be cut to uniform lengths while being mitered; and means for securing the block to the gauge member including a plate extending laterally from said block, a slide piece attached to the plate and projecting into an undercut guide slot in said gauge member; and a clamp screw associated with said slide piece for fixing the block in its adjusted positions.

4. The combination with a type cutting machine having a cutting tool, a work supporting table movable with respect to said tool, and a gauge member pivotally mounted to said table, of a work holding and positioning device for use in mitering in the form of a block adjustable along said gauge member, said block having its forward end sloped at the angle to which the miter is to be cut to afford an abutment for the ends of rule or border slugs; and a retainer strip attached, with provisions for adjustability, to one side of the block to overlap the ends of the type in holding the same to the straight edge of the aforesaid gauge member.

5. The combination with a type cutting machine having a cutting tool, a work supporting table movable with respect to said tool, a gauge member swivelly mounted to said table, and a vice comprising an extensible bar, of a work holding and positioning device for use in mitering in the form of a block adjustable along said gauge member, said block having its forward end sloped at the angle to which the miter has to be cut to afford an abutment for the ends of rules or border slugs; and a retainer strip attached, with provisions for adjustability, to one side of the block to overlap the ends of the type in holding the same to the straight edge of the gauge member, said strip having, at its forward extremity, a notched head adapted for cooperation with the end of the extensible rod of the gauge device.

6. The combination with a type cutting machine having a cutting tool, a work supporting table movable with respect to said tool, and a gauge member pivotally mounted to said table, of a work holding and positioning device for use in mitering in the form of a block adjustable along said gauge member, said block having its forward end sloped at the angle to which the miter is to be cut to afford an abutment for the ends of the rule or border slugs so that a number of the latter may be cut to uniform lengths while being mitered, and means for releasably securing the block against movement relative to the gauge member subsequent to any adjustment of the block relative to the gauge member.

7. The combination with a type cutting machine having a cutting tool, a work supporting table movable with respect to said tool, a gauge member pivotally mounted to said table and a work holding member having minute adjustment relative to the gauge member, of a work positioning means movable by the work holding member to desired position and having a sloping surface for abutment by the rule or border slugs so that the latter may be cut to uniform lengths while being mitered, and means to releasably secure the work positioning means against movement relative to the gauge member subsequently to adjustment of the former.

8. The combination with a type cutting machine having a cutting tool, a work supporting table movable with respect to said tool, a gauge member pivotally mounted on the table, of a work holding and positioning means in the form of a block having a sloping face for abutment by the rule or border slug ends to permit the latter to be cut to uniform lengths while being mitered, a retaining means engaging the outermost rule or slug to stack and hold the latter in place, and means adjustable with respect to the table engaging the retaining means to secure the latter in place.

In testimony whereof, I have hereunto signed my name, at Philadelphia, Pennsylvania, this 22nd day of July 1921.

JOHN LOGUE.

Witnesses:
JAMES H. BELL,
E. L. FULLERTON.